United States Patent

[11] 3,610,928

| [72] | Inventor | Edward Wherry Thomas<br>Morris Plains, N.J. |
|---|---|---|
| [21] | Appl. No. | 745,816 |
| [22] | Filed | July 18, 1968 |
| [45] | Patented | Oct. 5, 1971 |
| [73] | Assignee | Intertechnique S.A.<br>Plaisir, France |
| [32] | Priority | July 19, 1967 |
| [33] | | France |
| [31] | | 114.876 |

[54] QUENCH COMPENSATION IN LIQUID SCINTILLATION SPECTROMETRY
9 Claims, 3 Drawing Figs.

[52] U.S. Cl. ................................................... 250/71.5,
250/83.3, 250/106

[51] Int. Cl. .................................................. G01t 1/20
[50] Field of Search .......................................... 250/71.5,
106 SC, 83.3

[56] References Cited
UNITED STATES PATENTS
3,381,130 4/1968 Nather ...................... 250/71.5

*Primary Examiner*—Archie R. Borchelt
*Assistant Examiner*—Davis L. Willis
*Attorney*—Lane, Aitken, Dunner & Ziems

ABSTRACT: For constant efficiency counting of variably quenched sample labeled with $^{14}C$ or more energetic isotopes, the counts in two nonadjacent energy ranges, one of which corresponds to the spectrum of the most quenched sample, are added.

PATENTED OCT 5 1971

3,610,928

INVENTOR
Edward Wherry Thomas

BY
Lane, Aitken, Dunner + Ziems
ATTORNEY 3,610,928

QUENCH COMPENSATION IN LIQUID SCINTILLATION SPECTROMETRY

BACKGROUND OF THE INVENTION

The invention relates to liquid scintillation counting and more particularly deals with the problems associated with the inhibition of performance collectively termed "quenching".

One of the principal problems faced in liquid scintillation counting is the determination of counting efficiency of each individual sample (usually a soft $\beta$ emitter) of a batch. Quenching, a collective term applied to phenomena which tend to degrade counting performance, is due, among other causes, to the presence of colored material within the sample which interferes with light transmission (color quenching) and/or to the presence of colorless material which inhibit energy transfer and/or the scintillation process (chemical quenching). Since recent liquid scintillation counting instruments have highly stable amplification gain and high voltage, thereby overcoming formerly troublesome aspects of system operation, the problems associated with quenching are now of primary importance.

Several solutions have been proposed for this problem. Before they are summarized, it may be useful to review the effects of quenching on the liquid scintillation spectra of radioisotopes.

The $\beta$ emitting isotopes produce decay events whose energies are spread over a spectrum which is characteristic of the emitter, with a repartition corresponding to a small proportion in the lower energy range and the highest proportion in an intermediate energy range. The decay events are transduced by a scintillator, photomultiplier and amplifier to pulses whose spectrum is representative of that of the emitter either directly (if linear amplification is used) or with a transformation (if for instance logarithmic amplification is used).

Quenching reduces the number of photons available to the photomultiplier confronting the sample. For isotopes whose decay events provide an energy spectrum extending to an energy corresponding to emission of a large number of photons (such as $^{14}C$ -for which the maximum energy events give rise to about 1,000 photons, $^{32}P$, etc.), quenching may eliminate the possibility of detection of some low energy events and also reduce the height of each electrical pulse resulting from higher energy event and detected by the photomultiplier, thereby:

a. shifting the end of the pulse height spectrum (counts per minute vs. pulse height) toward lower values.

b. Shifting the maximum of the spectrum to lower values of the pulse height.

On the contrary, effect (a) greatly predominates with $^3H$ whose maximum energy events give less than 140 photons and whose mean energy events give 20–40 photons. Even without quenching many low energy events are not counted due to insufficient light output; in the presence of quenching some of those events formerly above but near the limit of detection are likely to be lost. As a result, there is no substantial shift of the maximum portion of the spectrum, but rather a downward shift of the curve.

Various methods have been developed to evaluate the quenching effect; a broadly used method, now called "external standardization" was suggested in a paper by W. L. Kaufman at the "University of New Mexico Conference on Organic Scintillation Detectors" (Aug. 1960), published in U.S. Atomic Energy Commission document T.I.D. 7612; according to this method, the sample to be measured is counted twice, one of the counts being carried out with a gamma source in operative association with the sample. The counting rate contributed by the Compton electrons produced by the standard gamma source is influenced by the same parameters as the counting rate of the sample itself, particularly quenching of the liquid scintillation. By measuring gamma induced and beta counting rates with respect to the tenor of the solution, a calibration curve can be established relating the counting efficiency for each beta emitter present in the sample to the induced gamma activity. The gamma source is counted using solutions containing different percentages of quenching agents and a same amount of beta activity. During later measurements of any sample labeled with the same beta emitting radioisotope, incorporated in the same or similar counting solution, the counting of the gamma source is determined by comparing the contribution of the source to the gross counting rate with the counting rate induced by the same source in a nonquenched solution. The counting efficiency of the sample is then deduced from the calibration curve.

Another method, proposed by L. A. Baillie in 1960 in an article published in the "International Journal of Radioactive Isotopes" 8—1 (1960), consists of experimentally determining a calibration curve relating the counting efficiency of an isotope to the ratio of the counting rates of that same isotope in two determined energy fields: This approach is generally known as the "channels ratio" method.

Both solutions provide satisfactory results but they have drawbacks; in the first, at least two counting operations are necessary as well as the use of an external source which may require both shielding and mechanical actuation. In both methods, calibration curves must be constructed and separately interpreted for each sample. It is thought to be disadvantageous that quenching should be computed from the results of the measurements and later taken into account.

Still other approaches have been proposed, such as the "-balance point" or "balanced quenching" technique, which may be used for counting the isotopes which exhibit a spectral shift upon quenching, such as $^{14}C$: use is made of a discriminator having a narrow window centered on the region in which the curves representative of the pulse spectra height of quenched and unquenched samples intersect. This method is simple, but adjustment of the window is critical and counting efficiency is much reduced.

SUMMARY OF THE INVENTION

It is an object of the invention to provide a method and apparatus which permit a plurality of differently quenched single label isotopes to be counted at substantially constant efficiency.

It is another object of the invention to provide a new and improved method and apparatus for quench compensation which requires one count only to be carried out on each sample.

Variably quenched single isotope samples labeled with $^{14}C$ or more energetic isotopes are counted at substantially constant efficiency by adding the counts in two preselected distinct energy windows. In this manner the necessity of several counts and of referring to calibration curves is eliminated at slight sacrifice of counting efficiency.

It is important to note that the sacrifice in the efficiency is particularly low and quite negligible on the most quenched samples.

Other objects of the invention will become apparent from the following description of illustrative embodiments of the invention. The description refers to the accompanying drawing, wherein.

BRIEF DESCRIPTION OF THE PREFERRED EMBODIMENTS

Figure 1:
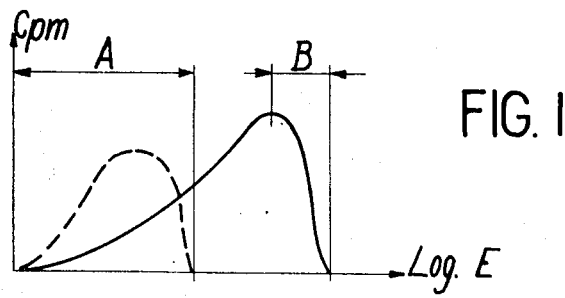
FIG. 1 is a graphical representation of the energy spectrum (counts per minute vs. pulse height) of two samples of a series labeled with carbon 14 in least quenched (full line curve) and most quenched (dot line curve) conditions.

Referring first to FIG. 1, there are shown the spectrum of carbon 14 in unquenched condition and for the greatest amount of quenching which is expected from any sample in a batch to be counted.

The words "Range A" will be used to designate that energy range which extends from the maximum energy level for the most quenched isotope to either zero energy (as shown on FIG. 1) or to a low-energy level. The latter choice may be preferable, since pulse heights below a minimum voltage are not significant due to the high amount of background noise of low amplitude. Selection of the events in range A may be obtained by means of a discriminator having an adjustable pulse height window.

The words "Range B" will be used to designate an energy range extending from the maximum energy for the sample of the batch which exhibits minimum quenching (possibly no quenching) to a lower energy threshold so selected that the following two counting rates be substantially equal:

-the counting rate in range A for the most quenched sample;
-the sum of the counting rates in ranges A and B for the least quenched sample.

With the ranges A and B set in this manner, the sums of the counting rates in ranges A and B will be a constant percentage of the decay events produced by all samples intermediate between the least quenched sample and the most quenched sample, if the difference in quenching between the most quenched sample and the least quenched sample is not extreme. Thus, by adding the counts in ranges A and B all the samples can be counted with substantially constant efficiency. One may admit that the method is less precise if the spread between the maximum and minimum efficiency samples is excessive. For example, excellent results were obtained in a $^{14}C$ series wherein the least quenched sample was counted with about 85 percent efficiency and the most quenched with 50 percent efficiency. On the other hand, results were less satisfactory when the spread was from 85 percent to 30 percent.

Figure 2:
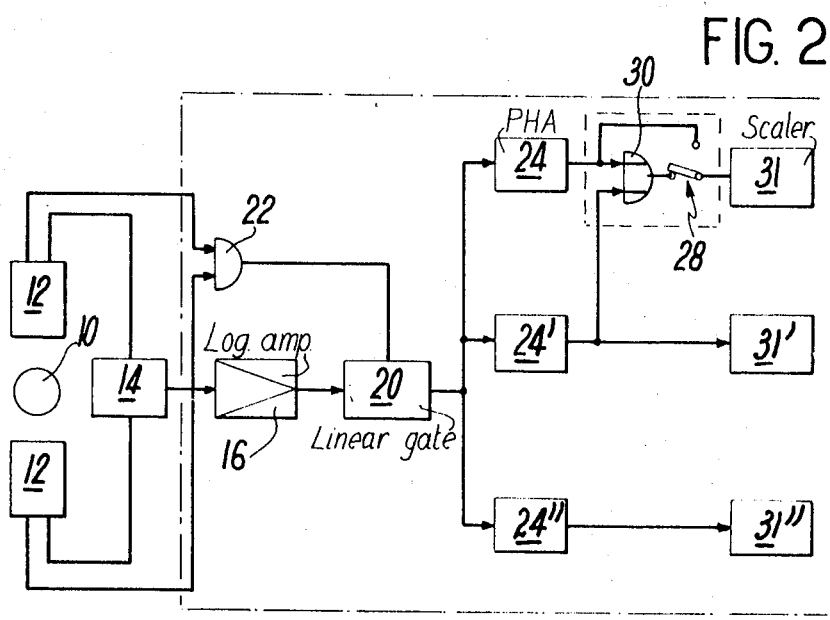
FIG. 2 is a simplified block diagram of the essential components of a liquid scintillation system according to the invention.

Referring now to FIG. 2, there is illustrated a liquid scintillation spectrometer for counting beta decay events in liquid samples. Each sample 10 consists of a transparent vial containing a solvent in which a scintillator and a compound labeled with traces of one beta emitting isotopes are dissolved. All samples of a same batch contain the same isotope which exhibits a substantial spectral shift upon quenching. This condition is fulfilled by $^{14}C$ and those isotopes which emit more energetic beta rays such as $^{32}P$, $^{35}S$, $^{45}Ca$, $^{131}I$, $^{24}Na$, etc., the spectrometer has a lighttight chamber for receiving each sample to be counted in turn. Two photomultiplier tubes 12 are positioned adjacent to the sample 10 when the latter is in the chamber.

The electrical pulses from both phototubes 12 are directed to a coincidence circuit 22 and to a pulse summation circuit 14 which may be of any conventional construction, although a resistive network is generally to be preferred. The height of each pulse is substantially proportional to the number of photons received by the phototubes 12 responsive to the decay event which causes it and gives a measure of the energy of the beat particle (approximately 5–7 photons per kev., are emitted).

The pulses from the summation circuit 14 are applied to a logarithmic amplifier 16. The output of the log amplifier 16 is connected to a linear gate 20 cooperating with the coincidence circuit 22 for reducing the background noise due to the spurious pulses generated by the phototubes: the coincidence circuit permits the linear gate to deliver a signal which is proportional to the signal from log amplifier 16 if at the same time it is activated by the coincidence circuit. The coincidence circuit 22 will activate the linear gate 20 whenever it received pulses simultaneously from the two phototubes 12.

The signals from the output of linear gate 20 are simultaneously applied to a plurality of selector channels (two channels at least being necessary). Since the invention will generally be used in spectrometers adapted to count plural label or mixed-label samples, more than two channels are frequently available and three such channels have been illustrated. Each channel comprises a pulse height analyzer 24, 24' or 24" and a scaler 31, 31' or 31" the lower and upper thresholds of the window of analyzer 24 are set to correspond to energy range A. The thresholds of analyzer 24' are set to correspond to energy range B. The output of analyzer 24 may feed the scaler 31 directly through a switch 28. But when the switch 28 is in the position illustrated in FIG. 2, the outputs of both analyzers 24 and 24' are connected through a logical OR gate 30 to scaler 31 so that the latter records the total count in ranges A and B.

A convenient approach is used for adjusting the windows for analyzers 24 and 24'. Settings are made based on standard samples and later the experimental test samples are counted within the windows previously established with the standards.

Two standards are prepared preferably using a counting solution of the same composition as that which is to be used for counting experimental test samples. The same known radioactivity level of the isotope of interest (in nonquenching form) is added to each standard. Quenching agent is now deliberately added to one sample in an amount such that the degree of quenching of that sample approximates the degree of quenching of the most quenched experimental test sample which the investigator is likely to encounter. The second sample may be left unquenched or, if previous experience has indicated that all samples are quenched to some degree, the quenching agent may be added to that second sample in an amount such as to approximate the degree of quenching which the investigator can anticipate will be present in the least quenched of his experimental test samples.

With gate 30 disabled by positioning switch 28 to feed the output of the analyzer 24 directly to the scaler 31, the more quenched of the two standards is placed in the counter and settings of the pulse height analyzer 24 are made so as to bracket substantially all of the spectrum of that sample. The sample is then counted; the second standard is now placed in the counting chamber. The upper level of the pulse height analyzer 24' is adjusted by conventional means so as to encompass the observed spectrum of that sample. The lower level of pulse height analyzer 24' is next adjusted such that the combined total of the counts from analyzers 24 and 24' for this second sample is equivalent to the number of counts observed for the first sample pulse height analyzer 24. In this manner, the pulse height analyzer 24 is set to pass pulses in range A, and the pulse height analyzer 24' is set to pass pulses in range B. With the windows of the pulse height analyzer set in this manner, the sum of the pulses passing through the pulse height analyzers 24 and 24' will be a count of constant efficiency of each of the experimental test samples. This count of constant efficiency may be recorded in the scaler 31 by positioning the switch 28 to enable the OR gate 30.

$^{14}C$ labeled quenched samples which, when examined by the conventional method varied from 64 percent to 82 percent counting efficiency, were counted with this method: The observed value of counting efficiency varied between 53 percent and 55 percent. Incidentally, in many cases, it is not essential that the absolute value of the counting efficiency be known. What is important is to keep it substantially constant.

Figure 3:
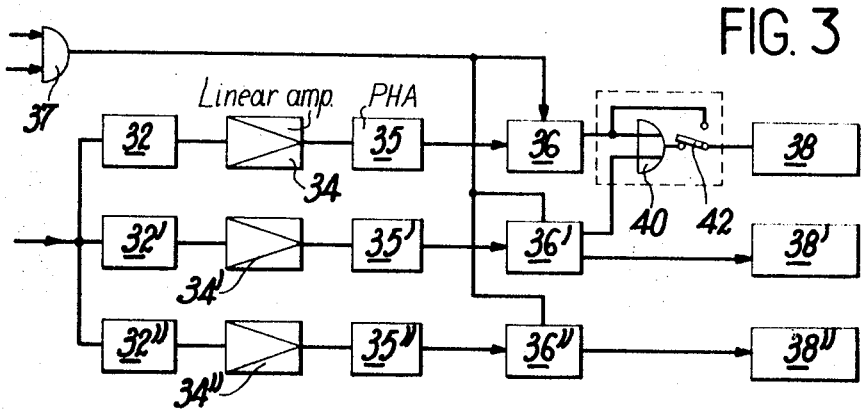
FIG. 3 is a block diagram of an alternative embodiment of the portion of the circuit which is within the frame in dash-dot lines on FIG. 2.

Referring now to FIG. 3, there is shown a modified embodiment using linear amplification in each channel. For more clarity, the corresponding components in all channels bear the same reference numerals with prime and second marks assigned there to in the second and third channels. The summation circuit (not shown) feeds the three channels, each having an adjustable attenuator 32, 32' or 32", a fixed gain linear amplifier 34, 34' or 34". The output pulses of the amplifier are passed through a pulse height analyzer 35, 35' or 35" having an adjustable window to a linear gate 36, 36' or 36" which is normally closed and is opened by the coincidence circuit 37 when the latter receives simultaneous pulses from the photomultipliers (not shown). Each channel also includes a scaler 38, 38' or 38".

According to the invention, an additional circuit is inserted between the linear gate 36 and the scaler 38. This circuit essentially comprises an OR gate 40 and a switch 42. The manually actuated switch 42 is adapted to connect the input of the scaler 38 either to the output of gate 36 or to the output of the OR gate 40. The two inputs of the OR gate are fed by the linear gates 36 and 36'. When the switch is in the position illustrated in FIG. 3, the scaler 38 receives the pulses from the first and second channels whose energy windows are so adjusted that they correspond to ranges A and B of FIG. 1.

Numerous modifications may be made: In order to extend the range of operation, it may be advantageous to sum the contents of three counting channels, A, B and C. The principles of system construction remains unchanged excepting that a tree input OR gate replaces the two input gate previously described. The complexity of instrument setup is increased and therefore this mode of operation is not recommended unless it becomes absolutely necessary.

MOre generally, it will be apparent to those skilled in the art that the device of the invention may be constructed in a variety of ways without departing from the scope and spirit of the appended claims.

I claim:

1. A process of liquid scintillation counting at substantially the same counting efficiency of a plurality of samples exhibiting different amounts of quenching and containing the same beta-emitting isotope, the pulse height spectrum of said samples exhibiting a substantial shift upon quenching, comprising the steps of: converting the decay events of each sample to pulses varying in amplitude with the energy of the corresponding decay events, counting the pulses in a first pulse height range, the upper limit of which corresponds to the upper limit of the pulse height spectrum that would be exhibited by one of said samples having the maximum expected amount of quenching, and counting the pulses in a second pulses height range selected so that the sum of the counting rates in said first and second ranges that would be produced by one of said samples having the minimum expected amount of quenching is equal to the sum of the counting rates in said first and second ranges that would be produced by one of said samples of the same activity as the sample having the minimum expected amount of quenching but having said maximum expected amount of quenching.

2. A process for liquid scintillation counting as recited in claim 1 further comprising summing the counts for each sample in said first and second ranges.

3. A process for liquid scintillation counting as recited in claim 1 wherein said second range is selected to extend from the greatest pulse height that would be produced by a sample exhibiting said minimum expected amount of quenching to a pulse height selected so that the sum of the count rates in said first and second ranges for the sample exhibiting said minimum amount of quenching is equal to the count rate in said first range for the sample of the same activity as the same having the minimum expected amount of quenching but exhibiting said maximum amount of quenching.

4. A process according to claim 2, wherein said isotope is $^{14}C$ or a more energetic isotope.

5. The process for counting at substantially the same counting efficiency decay events of a plurality of samples of beta emitting isotopes exhibiting different amounts of quenching, said samples containing the same beta-emitting isotope, the energy spectrum of said samples as detected exhibiting a substantial shift upon quenching, comprising the steps of: converting the decay events of each sample to signals having a characteristic varying with the energy of the corresponding decay events, counting with signals the said characteristic of which falls in a first range, the upper limit of which corresponds to the upper limit of the spectrum that would be exhibited by one of said samples having the maximum expected amount of quenching, and counting the signals the said characteristic of which falls into a second range selected so that the sum of the counting rates in said first and second ranges that would be produced by one of said samples having the minimum expected amount of quenching is equal to the sum of the count rates in said first and second ranges that would be produced by a sample of the same activity as the sample having the minimum expected amount of quenching but having said maximum expected amount of quenching.

6. A liquid scintillation spectrometry system for measuring at substantially constant counting efficiency the activity levels of a plurality of samples labeled with a same beta emitter exhibiting a substantial spectral shift upon quenching, comprising: means for converting light energy from beta events into electrical pulses and for amplifying said pulses, a first discriminator channel for passing only a first predetermined height range of said pulses extending downward from substantially the upper energy level of the most quenched sample expected in said plurality, a second discriminator channel for passing only a second predetermined height range of said pulses extending downward from the upper energy level of the least quenched sample expected in said plurality, the lower energy levels of said ranges being so selected that the counts are substantially equal for said expected samples of the same activity exhibiting said least and maximum amount of quenching.

7. A liquid scintillation spectrometry system as recited in claim 6 wherein there is provided means for recording the added counts in said first and second ranges.

8. A liquid scintillation spectrometry system as recited in claim 6 wherein the lower end of the range of said first pulse height discriminator is set so that such range corresponds to substantially the entire pulse height spectrum of the most quenched sample expected in said plurality.

9. The process counting at substantially the same efficiency decay events of a plurality of samples of beta emitting isotopes, said samples exhibiting different amounts of quenching and containing the same beta emitting isotope, the energy spectrum of said samples as detected exhibiting a substantial shift upon quenching, comprising the steps of: converting the decay events of each sample to signals having a characteristic varying in accordance with the energy of the corresponding decay events, and counting the signals the said characteristic of which falls in each of a plurality of ranges, the upper limit of a first one of said ranges being selected to correspond to the upper limit of the entire energy range which would be exhibited by one of said samples having the maximum expected amount of quenching, the remaining of said ranges being selected so that the sum of the counting rates in all of said plurality of ranges that would be produced by one of said samples having the minimum expected amount of quenching is equal to the counting rate in said first one of said ranges that would be produced by one of said samples of the same activity as the sample having the minimum expected amount of quenching but having said maximum expected amount of quenching.

UNITED STATES PATENT OFFICE
CERTIFICATE OF CORRECTION

Patent No. 3,610,928　　　　　　　　　Dated October 5, 1971

Inventor(s) Edward Wherry Thomas

It is certified that error appears in the above-identified patent and that said Letters Patent are hereby corrected as shown below:

Column 3, line 45, "lighttight" should be --light-tight--.

Column 3, line 56, "beat" should be --beta--.

Column 3, line 56, "kev." should be --keV--.

Column 3, line 67, "received" should be --receives--.

Column 4, line 52, "$^{14}c$" should be --$^{14}C$--.

Column 5, lines 11 and 12, "principles" should be --principle--.

Column 5, line 17, "MOre" should be --More--.

Column 5, claim 1, line 12, "pulses" should be --pulse--.

Column 5, claim 4, line 1, "$^{14}c$" should be --$^{14}C$--.

Column 5, claim 5, line 4, "beta-emitting" should be --beta emitting--.

Column 6, claim 9, line 1, after the word "process" and before the word "counting" should be inserted the word --of--.

Signed and sealed this 1st day of October 1974.

(SEAL)
Attest:

McCOY M. GIBSON JR.　　　　　　　　　C. MARSHALL DANN
Attesting Officer　　　　　　　　　　Commissioner of Patents